United States Patent
Ahn

(10) Patent No.: US 8,551,633 B2
(45) Date of Patent: Oct. 8, 2013

(54) SECONDARY BATTERY

(75) Inventor: Chang-Bum Ahn, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 13/550,440

(22) Filed: Jul. 16, 2012

(65) Prior Publication Data

US 2013/0045406 A1 Feb. 21, 2013

Related U.S. Application Data

(60) Provisional application No. 61/525,106, filed on Aug. 18, 2011.

(51) Int. Cl.
*H01M 4/00* (2006.01)

(52) U.S. Cl.
USPC ................................. 429/94; 429/62

(58) Field of Classification Search
USPC ...................................... 429/62, 94
See application file for complete search history.

(56) References Cited

U.S. PATENT DOCUMENTS

| | | | |
|---|---|---|---|
| 2007/0048613 A1* | 3/2007 | Yanagida et al. | 429/245 |
| 2007/0281206 A1* | 12/2007 | Fujikawa et al. | 429/62 |
| 2008/0096105 A1* | 4/2008 | Lee et al. | 429/163 |
| 2008/0274394 A1* | 11/2008 | Schormann et al. | 429/50 |
| 2009/0092889 A1* | 4/2009 | Hwang et al. | 429/94 |
| 2011/0129709 A1 | 6/2011 | Ahn et al. | |

FOREIGN PATENT DOCUMENTS

| | | |
|---|---|---|
| EP | 1 137 091 | 9/2001 |
| JP | 2009-211857 | 9/2009 |
| KR | 2006-0022126 | 3/2006 |
| KR | 2007-0006255 | 1/2007 |
| KR | 2009-0105619 | 10/2009 |

OTHER PUBLICATIONS

Extended European Search Report dated Nov. 21, 2012 for corresponding EP Application 12180329.0.

* cited by examiner

*Primary Examiner* — Carlos Barcena
*Assistant Examiner* — Michael Dignan
(74) *Attorney, Agent, or Firm* — Knobbe, Martens, Olson & Bear, LLP

(57) ABSTRACT

A secondary battery is disclosed. The secondary battery includes an electrode assembly comprising a first electrode plate and a second electrode plate that are rolled while having a separator interposed therebetween; and a finishing or protective conductive member formed on a periphery of the electrode assembly so as to surround a roll end of the electrode assembly, wherein the finishing member comprises a conductive layer that forms a conductive contact with a roll end of the first electrode plate and that is disposed to face a roll end of the second electrode plate. The secondary battery forms a short circuit path between positive and negative electrodes when the secondary battery is penetrated, and thus the secondary battery provides an improved degree of safety against a penetration shock caused by an external shock or a penetration test.

22 Claims, 7 Drawing Sheets

SECONDARY BATTERY

CROSS-REFERENCE TO RELATED APPLICATIONS

This application claims priority to and the benefit of U.S. Provisional Application No. 61/525,106, filed on Aug. 18, 2011, the entire content of which is incorporated herein by reference.

BACKGROUND OF THE INVENTION

1. Field of the Invention

One or more embodiments of the present invention relate to a chargeable and dischargeable secondary battery.

2. Description of the Related Art

There is an increase in demand for using a secondary battery as an energy source due to technology development and an increase of manufacturing of mobile devices such as mobile phones, notebooks, and the like. Recently, as a substitute energy source for replacing fossil fuel, secondary batteries are studied and developed to be used in electric vehicles and hybrid vehicles.

However, a secondary battery according to the related art does not have an appropriate safety device for dealing with an external shock or a penetration shock applied to the secondary battery during a penetration test, and thus there is a possible danger of combustion, breakage, and explosion of the secondary battery.

SUMMARY OF THE INVENTION

One or more embodiments of the present invention include a secondary battery having a safety device to reduce a possible danger of combustion, breakage, and explosion of the secondary battery due to a penetration shock.

According to one or more embodiments of the present invention, a secondary battery includes an electrode assembly comprising a first electrode plate and a second electrode plate that are rolled while having a separator interposed therebetween; and a finishing member positioned adjacent a periphery of the electrode assembly so as to surround a roll end of the electrode assembly, wherein the finishing member comprises a conductive layer that forms a conductive contact with a roll end of the first electrode plate and that is disposed to face a roll end of the second electrode plate.

The first electrode plate may form an outermost turn of the electrode assembly, the second electrode plate may be formed at an inner side of the first electrode plate, and the roll end of the second electrode plate may extend to a position that is away from the roll end of the first electrode plate.

The conductive layer may be disposed to face the roll end of the second electrode plate while having the separator interposed therebetween.

The conductive layer may extend to face the roll ends of the first and second electrode plates.

The conductive layer may include the same type of metal as the roll end of the first electrode plate.

The first electrode plate may include a first electrode collector and a first electrode active material formed on the first electrode collector, the second electrode plate may include a second electrode collector and a second electrode active material formed on the second electrode collector, and the roll ends of the first and second electrode plates may be formed as uncoated portions whereon the first and second electrode active materials are not formed.

The finishing member may further include an insulating layer formed on an outermost part of the finishing member so as to cover the conductive layer and a ceramic layer and an adhering layer that are interposed between the conductive layer and the electrode assembly.

The ceramic layer and the adhering layer may be formed to expose a portion of the conductive layer toward the electrode assembly.

The conductive layer may be exposed toward the roll end of the first electrode plate so as to form the conductive contact, and the ceramic layer and the adhering layer may be formed at positions that are away from the roll end of the first electrode plate.

The ceramic layer may contact the conductive layer so as to reinforce a strength of the metal layer.

The metal layer may be interposed between the insulating layer and the ceramic layer.

At the roll end of the electrode assembly, the second electrode plate may extend further than the first electrode plate, and the separator may extend further than the second electrode plate.

The finishing member may be attached on the periphery of the electrode assembly so as to surround an end of the separator.

When a side edge region and a central region are formed along a roll direction of the electrode assembly, the conductive contact between the conductive layer and the roll end of the first electrode plate may be formed in the side edge region, and the metal layer and the roll end of the second electrode plate may face each other in the central region.

In another aspect, the present invention comprises a secondary battery that provides protection against damage caused by a short circuit from a conductive external intrusion member. In this aspect, the invention comprises an electrode assembly comprising a first electrode, a second electrode and a separator that are rolled to form a roll so that the separator is interposed between the first and second electrode, wherein the electrode assembly includes a roll end section where the first and second electrodes end at the outer surface of the roll. In this aspect the invention further comprises a conductive protective member that is positioned adjacent the roll end section of the electrode assembly so as to be electrically connected to an end of the first electrode. Wherein the conductive protective member in this aspect is further dimensioned to overlie the second electrode such that when the conductive external intrusion member penetrates the conductive protective member and electrically contacts the second electrode, a short circuit path is formed by the conductive external intrusion member, the conductive protective member and the first electrode.

Thus, in a secondary battery according to one or more aspects or embodiments of the present invention, a short circuit path between positive and negative electrodes is formed when the secondary battery is penetrated, so that the secondary battery has improved safety against a penetration shock caused by an external shock or a penetration test.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF THE PREFERRED EMBODIMENT

Reference will now be made in detail to embodiments, examples of which are illustrated in the accompanying drawings.

Figure 1:
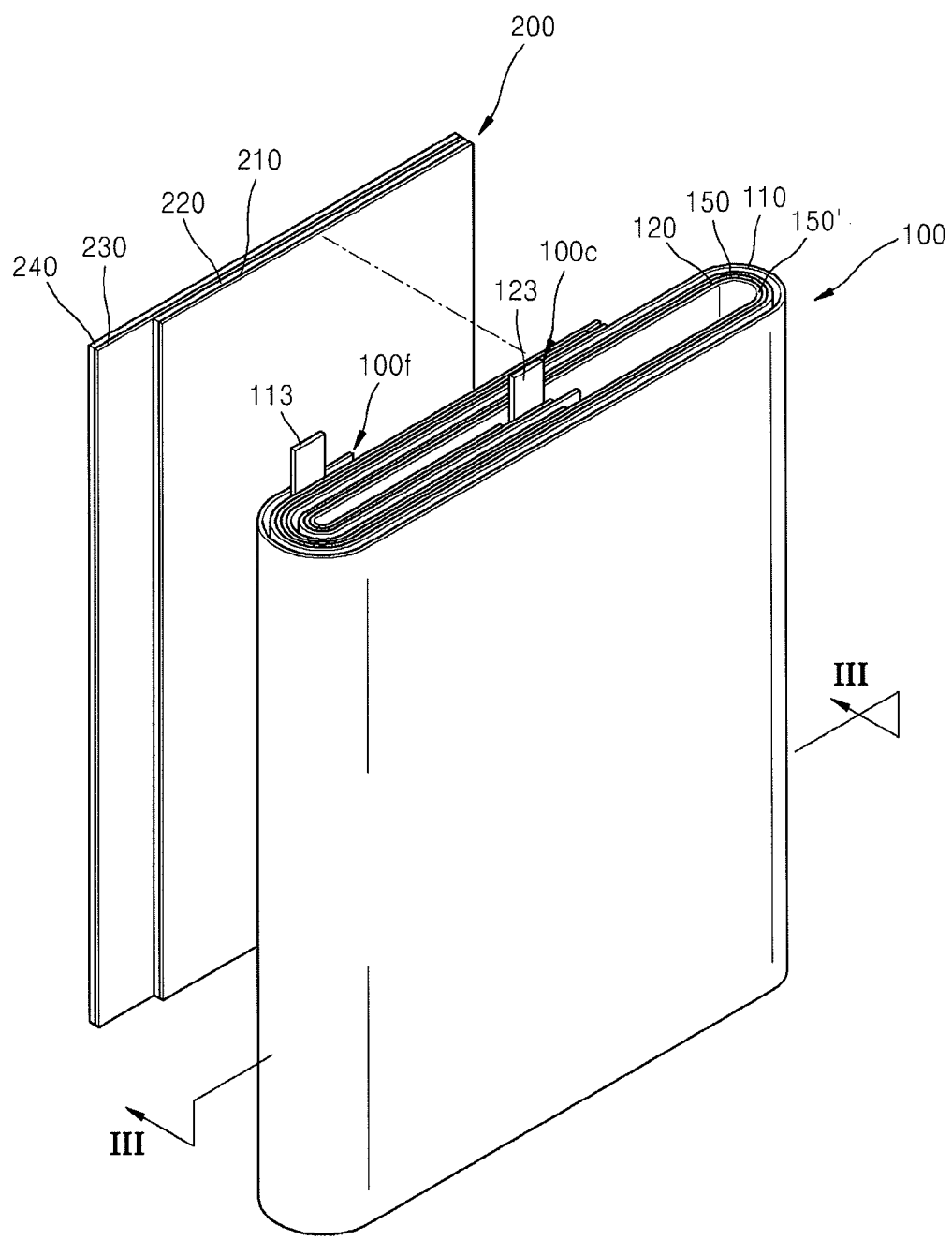
FIG. 1 is a perspective view of a secondary battery according to an embodiment of the present invention.

FIG. 1 is a perspective view of a secondary battery according to an embodiment of the present invention. Referring to FIG. 1, the secondary battery includes an electrode assembly 100 and a finishing member or conductive protective member 200 formed on a periphery of the electrode assembly 100.

The electrode assembly 100 is formed in a manner that first and second electrode plates 110 and 120 on which an electrode active material is coated are separated while having a separator 150 interposed therebetween, and then the first and second electrode plates 110 and 120 and the separator 150 are rolled together in the shape of a jelly roll. First and second electrode tabs 113 and 123 are formed on the first and second electrode plates 110 and 120 so as to output charges formed by a chemical reaction to an external circuit and to form a path of charging and discharging currents.

The first and second electrode plates 110 and 120 and the separator 150 between the first and second electrode plates 110 and 120 surround a roll center 100c and extend in the shape of a jelly roll from an inner direction toward an outer direction, and a roll end 100f corresponding to an end portion of the jelly roll is formed on the periphery of the electrode assembly 100.

The finishing member 200 is attached on the periphery of the electrode assembly 100 so as to surround the roll end 100f. The finishing member 200 prevents unrolling of the electrode assembly 100, and functions as a safety device to reduce a possible danger of combustion, breakage, and explosion of the secondary battery due to penetration of the secondary battery. For example, the finishing member 200 may provide a higher degree of safety in a penetration test for a secondary battery. In the penetration test, the safety of the secondary battery is tested in a manner where the secondary battery is charged to a standard level and then a center of the secondary battery is penetrated by a nail having a predetermined radius so as to test a possibility of combustion, breakage, and explosion.

When the secondary battery is penetrated, the finishing member 200 forms a short circuit path and thus the finishing member 200 may perform a protective action of discharging the secondary battery so as to allow charges in the secondary battery to be consumed and may reduce a possible danger of combustion, breakage, and explosion of the secondary battery.

Figure 2:
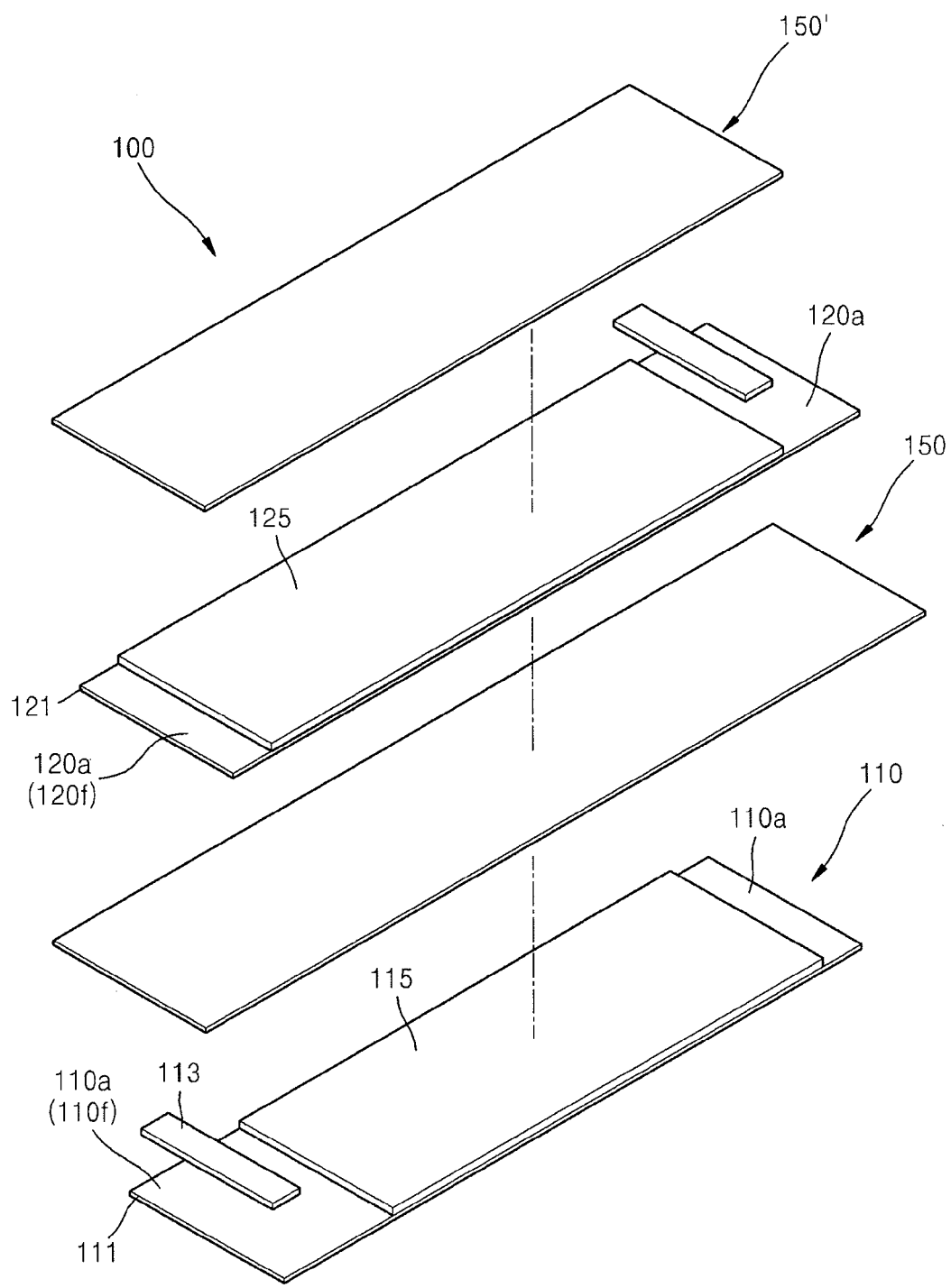
FIG. 2 is a development diagram illustrating an electrode assembly of FIG. 1.

FIG. 2 is a development diagram illustrating the electrode assembly 100 of FIG. 1. Referring to FIG. 2, in the electrode assembly 100, the first and second electrode plates 110 and 120 extend in the form of a bend along a single direction and are stacked to face each other while having the separator 150 interposed therebetween.

The first electrode plate 110 may include a first electrode collector 111 and a first electrode active material 115 formed on one surface of the first electrode collector 111. The first electrode collector 111 functions to provide a transfer path of charges generated in the first electrode active material 115 and to support the first electrode active material 115. For example, the first electrode plate 110 may function as a positive electrode and the first electrode collector 111 may include aluminum or an aluminum alloy.

The first electrode active material 115 may be formed in a manner that an electrode mixture formed of an electrode active material, a binder, and a conducting agent is dispersed in a solvent so as to have a slurry form, and then this is coated on at least one surface of the first electrode collector 111, is dried, and then is pressed.

Uncoated portions 110a on which the first electrode active material 115 is not formed may be formed on the first electrode plate 110. For example, the uncoated portions 110a may be formed at longitudinal ends of the first electrode plate 110, and since the first electrode active material 115 is not formed on the uncoated portions 110a, the first electrode collector 111 may be exposed via the uncoated portions 110a. The first electrode tab 113 for externally outputting charges generated due to a chemical reaction is formed on one of the uncoated portions 110a. For example, the first electrode tab 113 may be coupled with one of the uncoated portions 110a on the first electrode plate 110. In more detail, the first electrode tab 113 may be coupled by ultrasonic-welding. The first electrode tab 113 may function as a positive tab and may include aluminum or an aluminum alloy.

The second electrode plate 120 may include a second electrode collector 121, and a second electrode active material 125 formed on one surface of the second electrode collector 121. The second electrode collector 121 functions to provide a transfer path of charges generated in the second electrode active material 125 and to support the second electrode active material 125. For example, the second electrode plate 120 may function as a negative electrode and the second electrode collector 121 may include copper or a copper alloy.

The second electrode active material 125 may be formed in a manner that an electrode mixture formed of an electrode active material, a binder, and a conducting agent is dispersed in a solvent so as to have a slurry form, and then this is coated on at least one surface of the second electrode collector 121, is dried, and then is pressed.

Uncoated portions 120a on which the second electrode active material 125 is not formed may be formed on the second electrode plate 120. For example, the uncoated portions 120a may be formed at longitudinal ends of the second electrode plate 120, and since the second electrode active material 125 is not formed on the uncoated portions 120a, the second electrode collector 121 may be exposed via the uncoated portions 120a. The second electrode tab 123 for externally outputting charges generated due to a chemical reaction is formed on one of the uncoated portions 120a. For example, the second electrode tab 123 may be coupled with one of the uncoated portions 120a on the second electrode plate 120. In more detail, the second electrode tab 123 may be coupled by ultrasonic-welding. The second electrode tab 123 may function as a negative tab and may include nickel or a nickel alloy.

The first and second electrode plates 110 and 120 are stacked to face each other while having the separator 150 interposed therebetween, and the separator 150 between the first and second electrode plates 110 and 120 prevents a short between positive and negative electrodes. The separator 150 may be formed of a porous film having high ion permeability and a high mechanical strength. In more detail, the separator 150 may be formed of an olefin-based polymer including polyethylene, polypropylene, or the like. For example, the separator 150 may extend further in a longitudinal direction or a widthwise direction than the first and second electrode plates 110 and 120, and thus the separator 150 may prevent a short between the first and second electrode plates 110 and 120 due to thermal contraction.

The secondary battery may further include an electrolyte (not shown) impregnated in the electrode assembly 100. The electrolyte and the electrode assembly 100 may be contained together in a battery case (See, FIG. 7) and the electrolyte may be impregnated in the electrode assembly 100. For example, the electrolyte may include a non-aqueous electrolyte.

Figure 3:
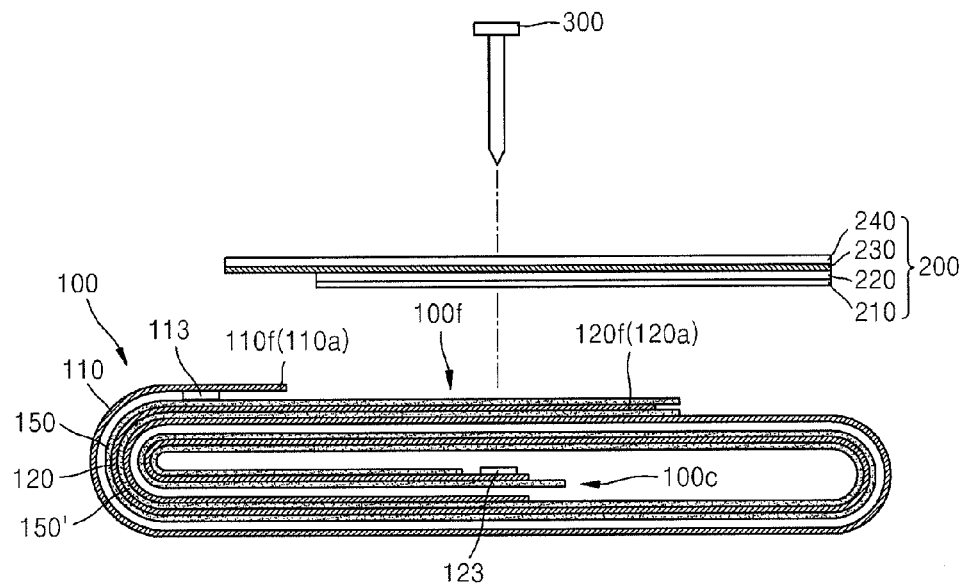
FIGS. 3 and 4 are cross-sectional views illustrating a coupled state of the electrode assembly and a finishing or conductive protective member.
Figure 4:
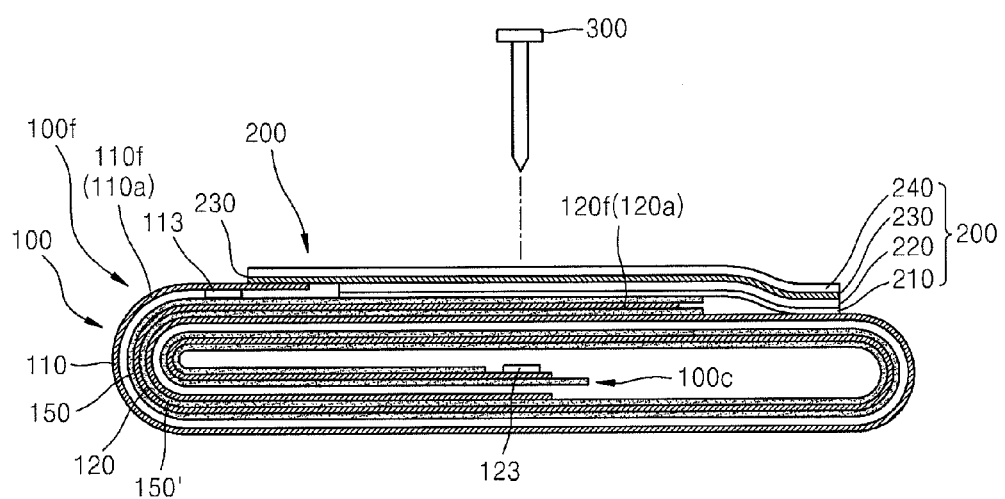

FIG. 3 is a cross-sectional view of the finishing member 200 of FIG. 1. FIG. 4 is a cross-sectional view illustrating a coupled state of the electrode assembly 100 and the finishing member 200.

The finishing or conductive protective member 200 includes an adhering layer 210 facing the electrode assembly 100 so as to be adhered to the electrode assembly 100, a conductive, e.g., metal, layer 230 facing the electrode assembly 100 so as to form a conductive contact with the electrode assembly 100, a ceramic layer 220 for reinforcing a strength of the metal layer 230 and for stabilizing a shape of the metal layer 230, and an insulating layer 240 forming an outermost part of the finishing member 200 so as to insulate the metal layer 230. The finishing member 200 may have a multilayer structure in which the adhering layer 210, the ceramic layer 220, the metal layer 230, and the insulating layer 240 are stacked with respect to each other.

The adhering layer 210 may be disposed to face the roll end 100f of the electrode assembly 100, and thus the adhering layer 210 may provide adhesion between the finishing member 200 and the electrode assembly 100. Also, the adhering layer 210 may be attached on the periphery of the electrode assembly 100 so as to surround the roll end 100f of the electrode assembly 100, and thus the adhering layer 210 may prevent unrolling of the electrode assembly 100. As will be described later, the adhering layer 210 may be formed to expose a portion of the metal layer 230.

The metal layer 230 forms the conductive contact with the electrode assembly 100. For example, the metal layer 230 is disposed to face the roll end 110f of the first electrode plate 110, which forms an outermost turn of the electrode assembly 100, and forms a conductive contact with the roll end 110f of the first electrode plate 110. The conductive contact may mean a state in which the metal layer 230 and the roll end 110f of the first electrode plate 110 physically contact each other, a state in which the metal layer 230 and the roll end 110f of the first electrode plate 110 are bonded by welding so as to be electrically connected to each other, or a state in which the metal layer 230 and the roll end 110f of the first electrode plate 110 are electrically connected to be substantially electrically connected to each other. For example, the metal layer 230 and the roll end 110f of the first electrode plate 110 may be constantly pressed against each other by the battery case containing the electrode assembly 100 and the finishing member 200.

The metal layer 230 may be formed of a metal thin plate having an excellent electrical conduction property. For example, the metal layer 230 may include the same metal type as the roll end 110f of the first electrode plate 110, and thus may form a low-resistance conductive contact.

If it is assumed that the first electrode plate 110 is formed as a positive electrode, the roll end 110f of the first electrode plate 110 and the first electrode collector 111 may be integrally formed of aluminum or an aluminum alloy. Here, the metal layer 230 may form the low-resistance conductive contact with the roll end 110f of the first electrode plate 110 by being formed of an aluminum thin plate or an aluminum alloy thin plate, which is the same metal type as the roll end 110f of the first electrode plate 110. In more detail, the metal layer 230 may be formed of an aluminum thin plate.

If it is assumed that the first electrode plate 110 is formed as a negative electrode, the roll end 110f of the first electrode plate 110 and the first electrode collector 111 may be integrally formed of copper or a copper alloy. Here, the metal layer 230 may form the low-resistance conductive contact with the roll end 110f of the first electrode plate 110 by being formed of a copper thin plate or a copper alloy thin plate, which is the same metal type as the roll end 110f of the first electrode plate 110. In more detail, the metal layer 230 may be formed of a copper thin plate.

The metal layer 230 extends while forming the conductive contact with the roll end 110f of the first electrode plate 110 and is disposed to face a roll end 120f of the second electrode plate 120. That is, the metal layer 230 may extend while having a sufficient length along a roll direction so as to face the roll ends 110f and 120f of the first and second electrode plates 110 and 120.

Since the metal layer 230 is disposed to face the roll end 120f of the second electrode plate 120, a short circuit path between positive and negative electrodes is formed between the metal layer 230 and the roll end 120f of the second electrode plate 120 when an external intrusion member 300 penetrates the electrode assembly 100. That is, the metal layer 230 forms the conductive contact with the roll end 110f of the first electrode plate 110, and is disposed to extend along the roll direction from the roll end 110f of the first electrode plate 110 and then to face the roll end 120f of the second electrode plate 120, and due to the separator 150 disposed between the metal layer 230 and the roll end 120f of the second electrode plate 120, the short circuit path between the positive and negative electrodes is inhibited.

When the external intrusion member 300 intrudes into the electrode assembly 100 in a direction to penetrate the electrode assembly 100, the metal layer 230 and the roll end 120f of the second electrode plate 120 are electrically connected to each other and form the short circuit path. Due to the short circuit path, charges accumulated between the first and second electrode plates 110 and 120 are rapidly consumed, and thus the danger of combustion, breakage, and explosion of the secondary battery is quickly reduced. For example, charges that are accumulated in the first and second electrode plates 110 and 120 may be rapidly consumed via the short circuit path formed between the metal layer 230 and the roll end 120f of the second electrode plate 120. An electrode active material may be omitted on the short circuit path extending from the roll end 110f of the first electrode plate 110, to the metal layer 230, and to the roll end 120f of the second electrode plate 120. In this manner, by omitting the electrode active material having a relatively high resistance on the short circuit path, heat generation due to Joule heating may be suppressed.

In more detail, the roll ends 110f and 120f of the first and second electrode plates 110 and 120, which face the metal layer 230, may be formed as the uncoated portions 110a and 120a on which the electrode active material is not formed. The roll end 110f of the first electrode plate 110 forms the short circuit path by forming the conductive contact with the metal layer 230, and the roll end 120f of the second electrode plate 120 forms the short circuit path by accepting the external intrusion member 300 and then forming an electrical connection with the external intrusion member 300, and thus the danger of heat generation and explosion due to penetration damage may be reduced in a manner that the roll ends 110*f* and 120*f* of the first and second electrode plates 110 and 120 are formed as the uncoated portions 110*a* and 120*a*.

The finishing member 200 may be attached on the electrode assembly 100 and thus the metal layer 230 of the finishing member 200 and the roll end 110*f* of the first electrode plate 110 may achieve a surface-to-surface contact. Here, the adhering layer 210 and the ceramic layer 220 between the metal layer 230 and the electrode assembly 100 may be formed to expose the metal layer 230. That is, the adhering layer 210, and the ceramic layer 220 may be formed at positions where the adhering layer 210 and the ceramic layer 220 do not face the roll end 110*f* of the first electrode plate 110, i.e., the adhering layer 210 and the ceramic layer 220 may be formed at positions that are away from the roll end 110*f* of the first electrode plate 110. For example, the adhering layer 210 and the ceramic layer 220 may not be formed over an entire length of the finishing member 200 in the roll direction but may be formed so as not to extend to positions where the adhering layer 210 and the ceramic layer 220 face the roll end 110*f* of the first electrode plate 110.

The finishing member 200 is formed on the periphery of the electrode assembly 100, and forms a physical contact with the electrode assembly 100. Here, the metal layer 230 and the adhering layer 210 respectively form a conductive contact and an adhesive contact on different areas on the periphery of the electrode assembly 100. In more detail, the metal layer 230 may form the conductive contact with the roll end 110*f* of the first electrode plate 110 of the electrode assembly 100, and the adhering layer 210 may be adhered on the separator 150 extending further than the roll end 110*f* of the first electrode plate 110.

The metal layer 230 may be covered with the insulating layer 240. The insulating layer 240 may insulate the metal layer 230, which forms the conductive contact with the electrode assembly 100, and may be formed on the outermost part of the finishing member 200 so as to cover the metal layer 230. For example, the insulating layer 240 may be formed of an insulating resin material.

The ceramic layer 220 may reinforce a strength of the finishing member 200, and thus the ceramic layer 220 may contribute to shape stability of the finishing member 200. In particular, the ceramic layer 220 inhibits shape deformation such as crumple or breakage of the metal layer 230, and helps the metal layer 230 to maintain its flat plate shape. The metal layer 230 forms the conductive contact with the electrode assembly and forms the short circuit path of the electrode assembly 100 during an emergency. Thus, when the physical contact between the metal layer 230 and the electrode assembly 100 is stably maintained by using the ceramic layer 220 and the metal layer 230 and the electrode assembly 100 maintain their surface-to-surface contact by using the ceramic layer 220, a voltage of the short circuit path may be decreased and a short circuit current of a high current may be rapidly discharged.

In more detail, the first electrode plate 110 of the electrode assembly 100 and the metal layer 230 form the conductive contact, and in this regard, they form the surface-to-surface contact and thus a contact resistance therebetween may be decreased. To do so, the ceramic layer 220 is disposed to overlap with the metal layer 230, and thus the metal layer 230 may be allowed to maintain its flat plate shape. In particular, strength reinforcement may be achieved to prevent crumple or breakage of the metal layer 230 even when the external intrusion member 300 penetrates the electrode assembly 100.

For example, when penetrated by the external intrusion member 300, deformation such as crumple or breakage of the metal layer 230 may occur when the metal layer 230 is penetrated due to a concentrated pressure. If deformation such as crumple or breakage of the metal layer 230 occurs, contact between the metal layer 230 and the roll end 110*f* of the first electrode plate 110 is changed from the surface-to-surface contact to a point-to-point contact, and thus the resistance of the short circuit path may be increased due to the fact that a contact resistance between the metal layer 230 and the roll end 110*f* of the first electrode plate 110 is increased, and heat may be generated due to the point-to-point contact.

The ceramic layer 220 may inhibit deformation of the metal layer 230 by reinforcing the mechanical strength of the metal layer 230, and may maintain the surface-to-surface contact between the metal layer 230 and the roll end 110*f* of the first electrode plate 110 by maintaining the flat plate shape of the metal layer 230.

The insulating layer 240 formed on the metal layer 230 may also function to reinforce the mechanical strength of the metal layer 230, in addition to its function to insulate the metal layer 230. That is, the insulating layer 240 and the ceramic layer 220 may have a sandwich shape while having the metal layer 230 interposed therebetween, and may maintain the surface-to-surface contact between the metal layer 230 and the roll end 110*f* of the first electrode plate 110 by maintaining the flat plate shape of the metal layer 230.

With respect to the arrangement between the finishing member 200 and the electrode assembly 100, an overlapping portion between the metal layer 230 of the finishing member 200 and the roll end 120*f* of the second electrode plate 120 may be disposed at a central position of the electrode assembly 100. The metal layer 230 and the roll end 120*f* of the second electrode plate 120 are disposed to overlap with each other, and during an emergency, they are electrically connected to each other by the external intrusion member 300 and form the short circuit path. Thus, in order to prepare for penetration damage in a central portion of the electrode assembly 100, the overlapping portion between the metal layer 230 and the roll end 120*f* of the second electrode plate 120 may be disposed at the central position of the electrode assembly 100.

The electrode assembly 100 includes the first and second electrode plates 110 and 120, which surround the roll center 100*c* and extend in the shape of a jelly roll from an inner direction toward an outer direction. The separator 150, which provides insulation between the first and second electrode plates 110 and 120, and the roll end 100*f* corresponding to an end portion of the jelly roll which is formed on the periphery of the electrode assembly 100.

At the roll end 100*f*, the first electrode plate 110 may form the outermost turn of the electrode assembly 100, the second electrode plate 120 may be disposed at an inner side of the first electrode plate 110, and the separator 150 may be disposed between the first and second electrode plates 110 and 120. The first electrode plate 110 may first stop extending along the roll direction before the second electrode plate 120 stops, and the second electrode plate 120 may extend further and is longer than the first electrode plate 110. The separator 150 may extend further than the first and second electrode plates 110 and 120, and by doing so, despite thermal contraction of the separator 150, the separator 150 may prevent a short between the first and second electrode plates 110 and 120.

In the roll direction, the uncoated portions 110*a* and 120*a* on which the electrode active material is not formed may be formed at the roll ends 110*f* and 120*f* of the first and second electrode plates 110 and 120. The first electrode plate 110 forms the conductive contact with the metal layer 230 of the finishing member 200 via one of the uncoated portions 110*a*, and thus heat generation due to the electrode active material may be suppressed on the short circuit path formed between the first electrode plate 110 and the metal layer 230. Also, the second electrode plate 120 accepts the external intrusion member 300 via one of the uncoated portions 120*a* and forms an electrical contact with the external intrusion member 300, and thus heat generation due to the electrode active material may also be suppressed on the short circuit path formed between the external intrusion member 300 and the roll end 120*f* of the second electrode plate 120.

The metal layer 230 of the finishing member 200 may extend along the roll direction of the electrode assembly 100 and may have a length sufficient to face the roll ends 110*f* and 120*f* of the first and second electrode plates 110 and 120. The metal layer 230 forms the conductive contact with the roll end 110*f* of the first electrode plate 110 and extends further along the roll direction than the roll end 110*f* of the first electrode plate 110, and thus the metal layer 230 faces the roll end 120*f* of the second electrode plate 120. The metal layer 230 and the roll end 120*f* of the second electrode plate 120 are disposed to face each other while having the separator 150 interposed therebetween, and thus a short between positive and negative electrodes may be prevented between the metal layer 230 and the roll end 120*f* of the second electrode plate 120.

With respect to the external intrusion member 300, which intrudes into the electrode assembly 100 in a direction to penetrate the electrode assembly 100, the metal layer 230 and the roll end 120*f* of the second electrode plate 120, which overlap with each other while having the separator 150 interposed therebetween, are electrically connected by the external intrusion member 300, and the short circuit path between positive and negative electrodes is formed therebetween. For example, charges that are collected on the first and second electrode plates 110 and 120 may be rapidly consumed via the short circuit path formed by the metal layer 230 and the roll end 120*f* of the second electrode plate 120, and since charges accumulated between the first and second electrode plates 110 and 120 are consumed, the danger of heat generation and explosion of the secondary battery may be reduced.

Figure 5:
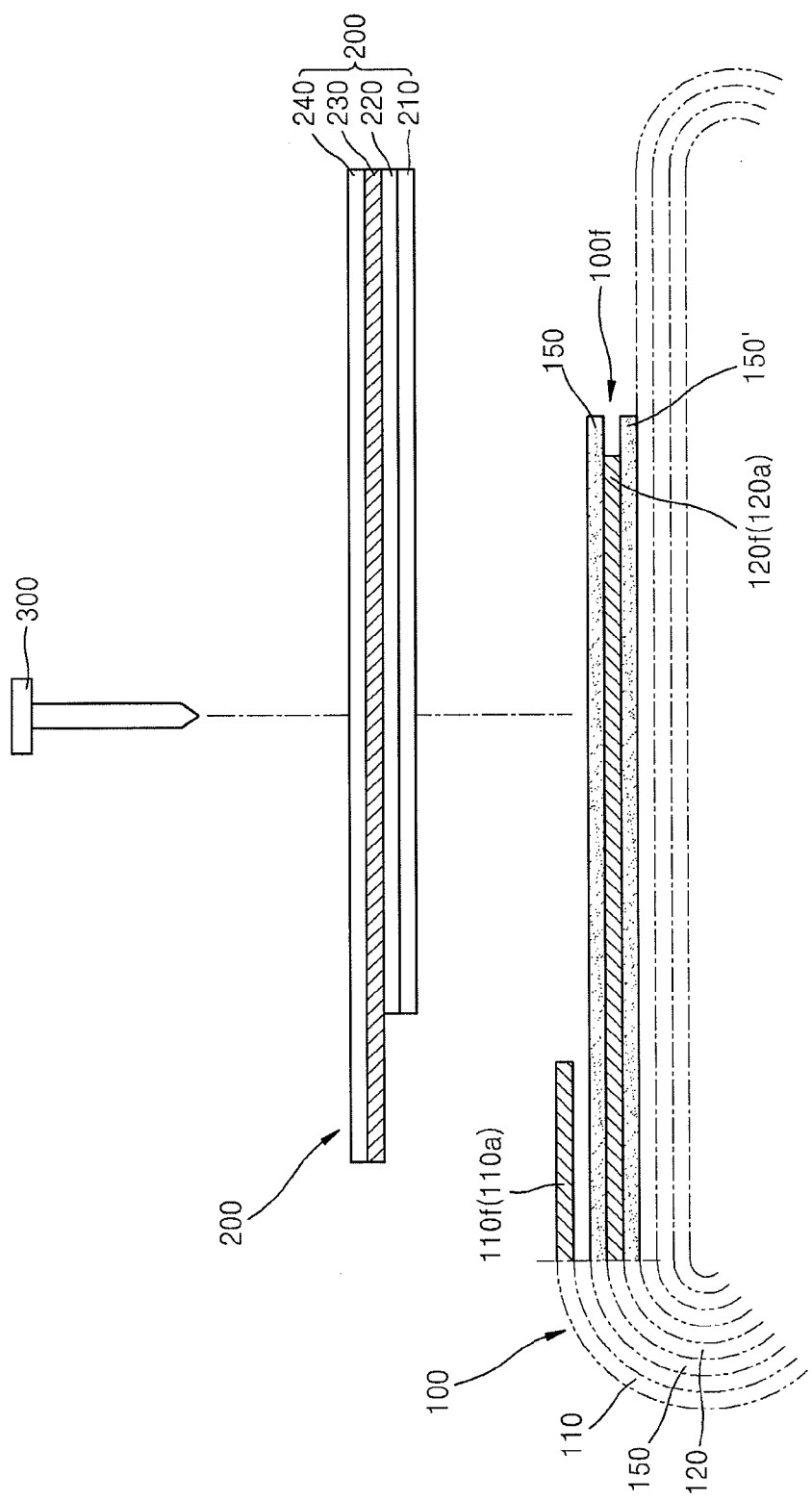
FIGS. 5 and 6 are cross-sectional views describing formation of a short circuit path by the finishing member when the secondary battery is penetrated.
Figure 6:
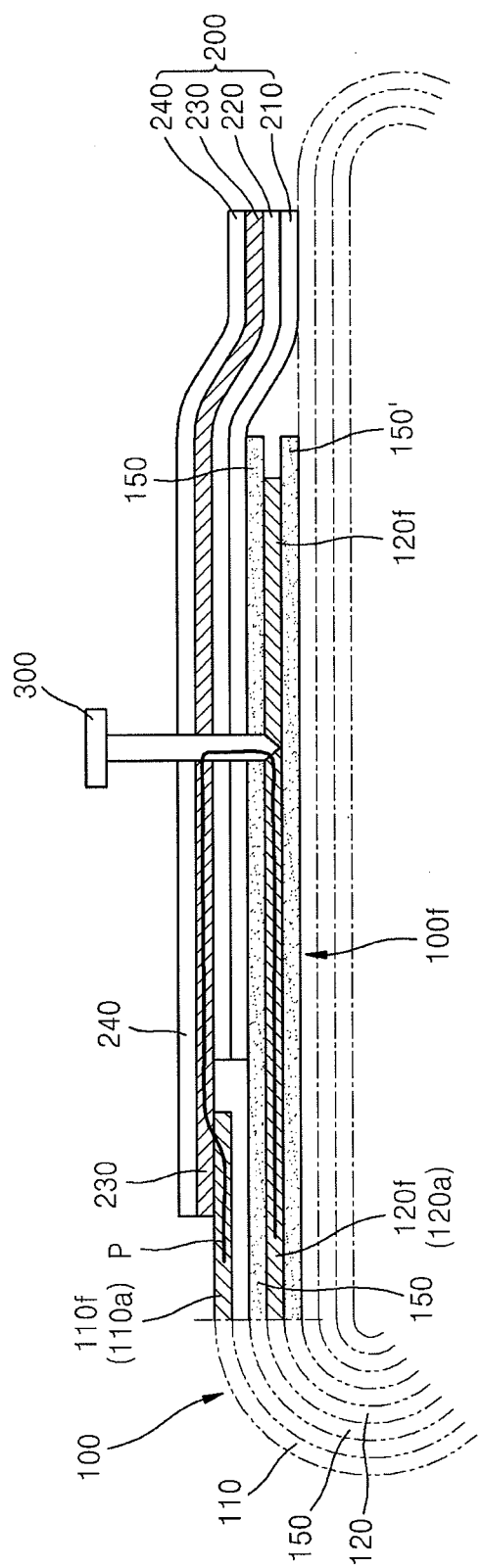

FIGS. 5 and 6 are cross-sectional views describing a short circuit path P formed when penetration damage occurs in the electrode assembly 100. In a case where the external intrusion member 300 intrudes into the electrode assembly 100 in a direction to penetrate the electrode assembly 100, for example, in a penetration test for the secondary battery, the safety of the secondary battery is tested in a manner that the secondary battery is charged to a standard level and then the center of the secondary battery is penetrated by a nail having a predetermined radius so as to test a possibility of combustion, breakage, and explosion. In this regard, when an external intrusion member such as the nail penetrates the electrode assembly 100, the short circuit path P is formed due to the finishing member 200, which is attached on the periphery of the electrode assembly 100.

That is, the finishing or conductive protective member 200 along with the external intrusion member 300 forms the short circuit path P, and thus the finishing member 200 may perform a protective action of discharging the secondary battery so as to allow charges of the secondary battery to be consumed and may reduce a possible danger of combustion, breakage, and explosion of the secondary battery.

In more detail, the finishing member 200 is attached on the periphery of the electrode assembly 100 so as to surround the roll end 110*f* of the electrode assembly 100. Here, the metal layer 230 of the finishing member 200 extends and has a length sufficient to face the roll ends 110*f* and 120*f* of the first and second electrode plates 110 and 120, which are formed at different positions on the periphery of the electrode assembly 100. The metal layer 230 forms the conductive contact with the roll end 110*f* of the first electrode plate 110, and in order to form the short circuit path P during an emergency, the metal layer 230 overlaps with the roll end 120*f* of the second electrode plate 120 while having the separator 150 interposed therebetween.

The external intrusion member 300, when intruded into the electrode assembly 100 in a direction to penetrate the electrode assembly 100, penetrates the metal layer 230 and the roll end 120*f* of the second electrode plate 120 and forms an electrical connection with them. Here, the short circuit path P between positive and negative electrodes is formed between the metal layer 230 and the roll end 120*f* of the second electrode plate 120. That is, when the external intrusion member 300 penetrates the metal layer 230, which is connected to the roll end 110*f* of the first electrode plate 110, and the roll end 120*f* of the second electrode plate 120, which is isolated from the metal layer 230 while having the separator 150 interposed therebetween, the external intrusion member 300 forms the short circuit path P, which electrically connects them. Charges that are collected on the first and second electrode plates 110 and 120 may be consumed via the short circuit path P formed by the metal layer 230 and the roll end 120*f* of the second electrode plate 120, and since charges accumulated between the first and second electrode plates 110 and 120 are consumed, the danger of combustion and explosion of the secondary battery may be reduced.

The electrode active material may be omitted on the short circuit path P extending from the roll end 110*f* of the first electrode plate 110, to the metal layer 230, and to the roll end 120*f* of the second electrode plate 120, and the roll ends 110*f* and 120*f* of the first and second electrode plates 110 and 120, which are disposed to face the metal layer 230, may be formed as the uncoated portions 110*a* and 120*a* on which the electrode active material is not formed. By omitting the electrode active material on the short circuit path P, heat generation due to the electrode active material having a relatively high electrical resistance may be suppressed, and a danger of combustion and explosion of the secondary battery may be reduced.

The roll end 110*f*, which forms the periphery of the electrode assembly 100, includes the roll end 110*f* of the first electrode plate 110, which forms the outermost turn, and the roll end 120*f* of the second electrode plate 120, which is disposed on the inner side of the roll end 110*f* of the first electrode plate 110. The roll ends 110*f* and 120*f* of the first and second electrode plates 110 and 120 are formed at different positions along the roll direction. For example, the roll end 120*f* of the second electrode plate 120 may be formed in a central region of the electrode assembly 100 so as to face the metal layer 230 at the central region. The central region may have a sufficient area in which the metal layer 230 and the roll end 120*f* of the second electrode plate 120, which have different polarities, overlap with each other and thus form the short circuit path P capable of consuming charges when the electrode assembly 100 is penetrated. In other words, the central region forms a safe region with respect to penetration damage. The roll end 110*f* of the first electrode plate 110 may be disposed at a side edge region of the electrode assembly 100 and may form the conductive contact with the metal layer 230 at the side edge region.

The separator 150 is interposed between the metal layer 230 and the roll end 120f of the second electrode plate 120, thereby inhibiting the short between positive and negative electrodes, which occurs between the metal layer 230 and the roll end 120f of the second electrode plate 120. To do so, the separator 150 may extend along the roll direction and have a sufficient length between the metal layer 230 and the roll end 120f of the second electrode plate 120, and despite thermal contraction of the separator 150, the separator 150 may prevent the short between the metal layer 230 and the roll end 120f of the second electrode plate 120.

The adhering layer 210 of the finishing member 200 may surround an extra portion of the separator 150 that extends from the roll end 110f of the first electrode plate 110 and may fix an end of the separator 150 at the periphery of the electrode assembly 100.

The ceramic layer 220 and the adhering layer 210 of the finishing member 200 are formed between the metal layer 230 and portions of the electrode assembly 100, other than the roll end 110f of the first electrode plate 110 so as not to interfere with the conductive contact between the metal layer 230 and the roll end 110f of the first electrode plate 110. The insulating layer 240 may be formed on the outermost part of the finishing member 200 so as to insulate the metal layer 230 by covering the metal layer 230.

In a case where the external intrusion member 300 intrudes into the electrode assembly 100 in a direction to penetrate the electrode assembly 100, the metal layer 230 having a thin plate thickness may be crumpled or damaged due to a press by the external intrusion member 300. Here, the ceramic layer 220, which is adjacent to the metal layer 230, or the insulating layer 240 and the ceramic layer 220, which are disposed in a sandwich shape while having the metal layer 230 interposed therebetween, help the metal layer 230 to maintain its flat plate shape without being crumpled or damaged by the external intrusion member 300 when the external intrusion member 300 penetrates the electrode assembly 100. Thus, the contact resistance between the metal layer 230 and the roll end 110f of the first electrode plate 110 is decreased by maintaining the surface-to-surface contact between the metal layer 230 and the roll end 110f of the first electrode plate 110, and the low resistance of the short circuit path P is maintained.

Figure 7:
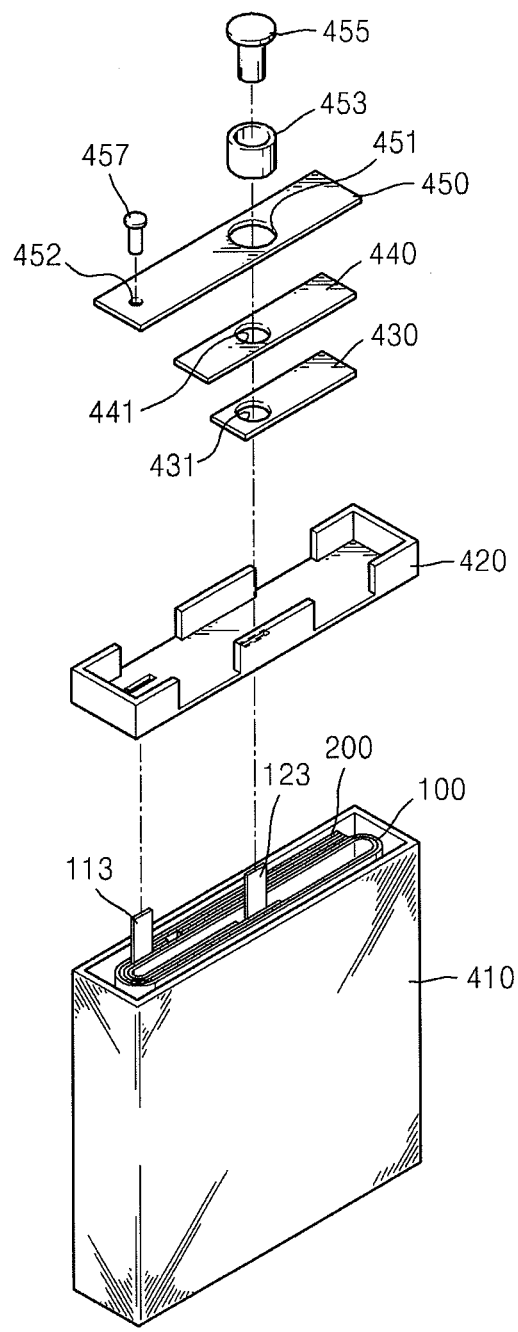
FIG. 7 is an exploded perspective view of a secondary battery according to another embodiment of the present invention.

FIG. 7 is an exploded perspective view of a secondary battery according to another embodiment of the present invention. Referring to FIG. 7, the electrode assembly 100 of FIG. 1 and the finishing member 200 formed on the periphery of the electrode assembly 100 may be contained in a battery case 410, and an upper opening of the battery case 410 may be sealed by a cap plate 450 when the electrode assembly 110 and the finishing member 200 are contained therein.

For example, the cap plate 450 may be electrically connected to the first electrode tab 113, which extends from an insulating case 420 after penetrating the insulating case 420, and an electrode terminal 455 to be electrically connected to the second electrode tab 123 may be assembled to the cap plate 450. The electrode terminal 455 may be assembled in a terminal hole 451 of the cap plate 450 while having an insulating gasket 453 interposed therebetween.

A terminal plate 430 that is electrically connected to the electrode terminal 455 may be disposed below the cap plate 450, and an insulating plate 440 may be interposed between the cap plate 450 and the terminal plate 430 so as to assure electrical insulation between them. For example, the electrode terminal 455 may be electrically connected to the second electrode tab 123 by penetrating through terminal holes 441 and 431 that are formed in the insulating plate 440 and the terminal plate 430, respectively. An electrolyte inlet 452 for injection of an electrolyte may be formed in the cap plate 450 and may be sealed by a sealing member 457.

The electrode assembly 100 and the finishing member 200 formed on the periphery of the electrode assembly 100 may be contained in any of battery cases having various shapes and structures, and thus may not be contained in the battery case 410 of FIG. 7 but may be contained in a cylindrical-shape case or a flexible case such as a pouch case.

Figure 8:
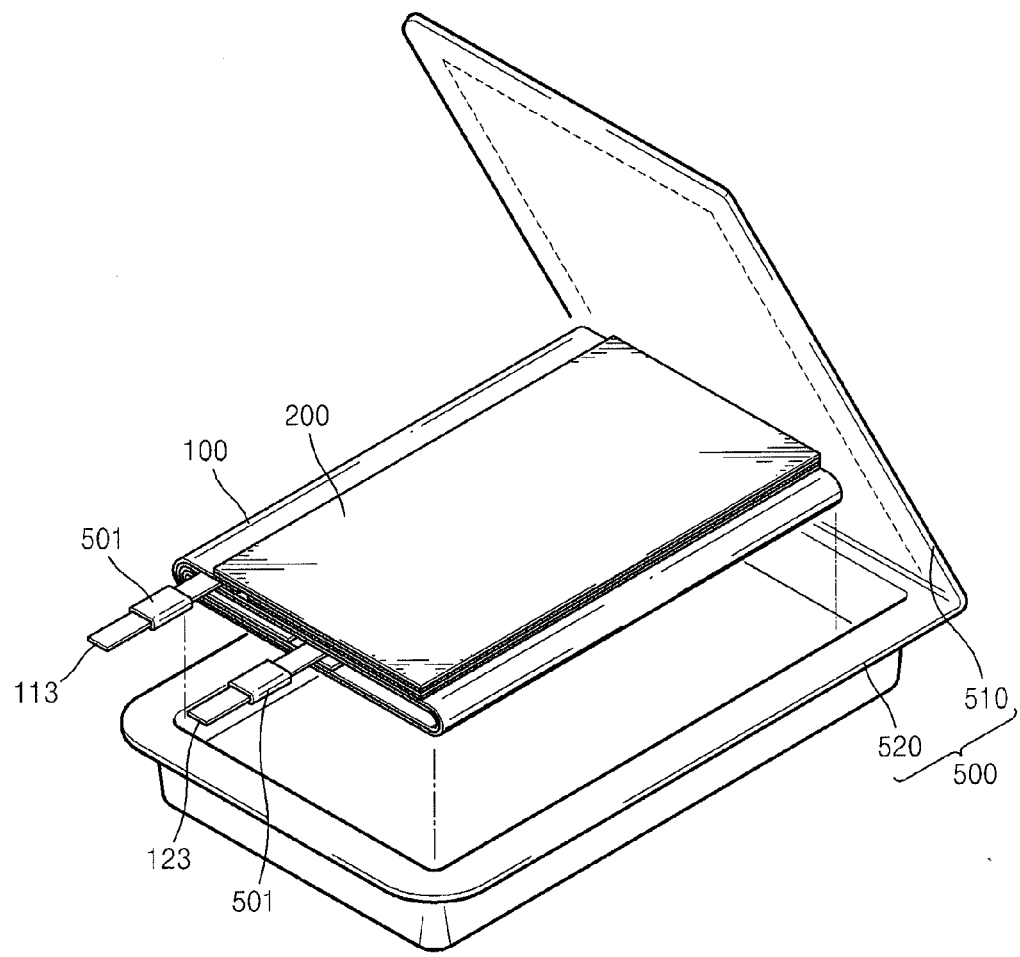
FIG. 8 is an exploded perspective view of a secondary battery according to another embodiment of the present invention.

Referring to FIG. 8, the electrode assembly 100 and the finishing member 200 formed on the periphery of the electrode assembly 100 may be contained in a battery case 500. The battery case 500 may include an upper case 510 and a lower case 520. The upper case and lower case 510 and 520 may be folded in a facing direction such that the electrode assembly 100 is sealed inside the battery case 500. The battery case 500 may be a flexible pouch-type case including a metal foil (not shown) and insulating films (not shown) stacked on both surfaces of the metal foil.

An insulating tape 501 may be respectively wrapped around the first and second electrode tabs 113 and 123. The insulating tape 501 is formed to insulate the first and second electrode tabs 113 and 123 from the case 500.

It should be understood that the exemplary embodiments described herein should be considered in a descriptive sense only and not for purposes of limitation. Descriptions of features or aspects within each embodiment should typically be considered as available for other similar features or aspects in other embodiments. The scope of the present invention should not be limited to the foregoing discussion but should be defined by the appended claims.

What is claimed is:

1. A secondary battery comprising:
   an electrode assembly comprising a first electrode plate and a second electrode plate that are rolled while having a separator interposed therebetween; and
   a finishing member positioned adjacent a periphery of the electrode assembly so as to be positioned proximate a roll end of the electrode assembly wherein the finishing member comprises an insulating layer, a conductive layer, a ceramic layer and an adhering layer wherein the insulating layer is formed on an outermost part of the finishing member so as to cover the conductive layer; and wherein the ceramic layer and the adhering layer are interposed between the conductive layer and the electrode assembly with the adhering layer contacting the electrode assembly;
   wherein the finishing member comprises a conductive layer having a first end that forms a conductive contact with a roll end of the first electrode plate by the first end overlapping the roll end the first electrode plate and that is disposed to face a roll end of the second electrode plate wherein, at the roll end of the electrode assembly, the second electrode plate extends further than the first electrode plate and the separator extends further than the second electrode plate wherein the finishing member is attached to the periphery of the electrode assembly so as to be positioned proximate an end of the separator.

2. The secondary battery of claim 1, wherein the first electrode plate forms an outermost turn of the electrode assembly, wherein the second electrode plate is formed at an inner side of the outermost turn of the first electrode plate, and wherein the roll end of the second electrode plate is spaced away from the roll end of the first electrode plate.

3. The secondary battery of claim 1, wherein the conductive layer is disposed to face the roll end of the second electrode plate while having the separator interposed therebetween.

4. The secondary battery of claim 1, wherein the conductive layer extends to face the roll ends of the first and second electrode plates.

5. The secondary battery of claim 1, wherein the conductive layer comprises the same type of metal as the roll end of the first electrode plate.

6. The secondary battery of claim 1, wherein the first electrode plate comprises a first electrode collector and a first electrode active material formed on the first electrode collector,
wherein the second electrode plate comprises a second electrode collector and a second electrode active material formed on the second electrode collector, and
wherein the roll ends of the first and second electrode plates are formed as uncoated portions whereon the first and second electrode active materials are not formed.

7. The secondary battery of claim 1, wherein the ceramic layer and the adhering layer are formed to expose a portion of the conductive layer toward the electrode assembly.

8. The secondary battery of claim 7, wherein the ceramic layer and the adhering layer are formed at positions that are away from the roll end of the first electrode plate.

9. The secondary battery of claim 1, wherein the ceramic layer contacts the conductive layer so as to reinforce a strength of the conductive layer.

10. The secondary battery of claim 1, wherein, when a side edge region and a central region are formed along a roll direction of the electrode assembly,
the conductive contact between the conductive layer and the roll end of the first electrode plate is formed in the side edge region, and
the conductive layer and the roll end of the second electrode plate face each other in the central region.

11. A secondary battery that provides protection against damage caused by a short circuit from a conductive external intrusion member comprising:
an electrode assembly comprising a first electrode, a second electrode and a separator that are rolled to form a roll so that the separator is interposed between the first and second electrode, wherein the electrode assembly includes a roll end section where the first and second electrodes end at the outer surface of the roll wherein, at the roll end of the electrode assembly, the second electrode plate extends further than the first electrode plate and the separator extends further than the second electrode plate;
a conductive protective member having a first end that is positioned adjacent the roll end section of the electrode assembly by the first end overlapping the roll end section of the electrode assembly so as to be electrically connected to an end of the first electrode and wherein the conductive protective member is attached to the periphery of the electrode assembly so as to be positioned proximate an end of the separator wherein the conductive protective member is further dimensioned to overlie the second electrode such that when the conductive external intrusion member penetrates the conductive protective member and electrically contacts the second electrode, a short circuit path is formed by the conductive external intrusion member, the conductive protective member and the first electrode wherein the conductive protective member comprises an insulating layer, a conductive layer, a ceramic layer and an adhering layer wherein the insulating layer is formed on an outermost part of the finishing member so as to cover the conductive layer; and wherein the ceramic layer and the adhering layer are interposed between the conductive layer and the electrode assembly with the adhering layer contacting the electrode assembly.

12. The secondary battery of claim 11, wherein the first electrode forms an outermost turn of the electrode assembly and wherein the second electrode is formed inward of the first electrode and wherein the first electrode roll end is spaced from the second electrode roll end.

13. The secondary battery of claim 11, wherein the first electrode has a coated portion and an uncoated portion, and wherein the roll end of the first electrode that is electrically contacted by the conductive protective member is uncoated.

14. The secondary battery of claim 11, wherein the conductive protective member is disposed to face the roll end of the second electrode while having the separator interposed therebetween so as to be insulated therefrom.

15. The secondary battery of claim 11, the conductive protective member includes a conductive layer and wherein the conductive layer comprises the same metal material as the first electrode.

16. The secondary battery of claim 11, wherein the conductive protective member further comprises:
an insulating layer formed on an outermost part of the conductive protective member so as to cover the conductive layer; and
a ceramic layer and an adhering layer that are interposed between the conductive layer and the electrode assembly.

17. The secondary battery of claim 16, wherein the insulating layer and the ceramic layer engage with the conductive layer so as to urge the conductive layer to remain substantially planar to increase the surface contact with the first electrode to thereby reduce the contact resistance therebetween.

18. The secondary battery of claim 17, wherein the ceramic layer and the adhering layer are formed to expose a portion of the metal layer toward the electrode assembly.

19. The secondary battery of claim 18, wherein the conductive layer is exposed toward the roll end of the first electrode so as to form the conductive contact, and
wherein the ceramic layer and the adhering layer are formed at positions that are away from the roll end of the first electrode so as to be interposed between the conductive layer and the second electrode.

20. The secondary battery of claim 11, further comprising a battery case that receives the electrode assembly and the conductive protective member and a cap plate that is electrically connected to the electrode assembly.

21. The secondary battery of claim 20, further comprising a cap plate wherein the case defines an inner recess that receives the electrode assembly and an opening that is sealed by the cap plate.

22. The secondary battery of claim 20, wherein the battery case comprises an upper case and a lower case that define a recess that receives the electrode assembly and wherein the upper case and the lower case are folded in a facing direction such that the electrode assembly is sealed in the recess of the battery case.

* * * * *